(12) United States Patent
Chindapol et al.

(10) Patent No.: US 9,287,911 B1
(45) Date of Patent: Mar. 15, 2016

(54) MITIGATING SIGNAL INTERFERENCE

(75) Inventors: Aik Chindapol, Washington, DC (US);
Daniel Vivanco, Sterling, VA (US);
Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 665 days.

(21) Appl. No.: 13/592,132

(22) Filed: Aug. 22, 2012

(51) Int. Cl.
*H04B 1/10* (2006.01)
*H04W 24/04* (2009.01)
*H04W 36/00* (2009.01)

(52) U.S. Cl.
CPC .......................................... *H04B 1/10* (2013.01)

(58) Field of Classification Search
USPC ........ 455/513, 522, 436, 437–445, 453, 63.1, 455/67.11; 370/328, 329, 331
See application file for complete search history.

(56) References Cited

U.S. PATENT DOCUMENTS

| | | | | |
|---|---|---|---|---|
| 5,722,044 A | * | 2/1998 | Padovani et al. | 455/443 |
| 5,732,359 A | * | 3/1998 | Baranowsky et al. | 455/552.1 |
| 6,072,985 A | * | 6/2000 | Wismer | 455/12.1 |
| 6,125,260 A | * | 9/2000 | Wiedeman et al. | 455/11.1 |
| 6,253,086 B1 | * | 6/2001 | Parantainen et al. | 455/446 |
| 6,879,829 B2 | * | 4/2005 | Dutta et al. | 455/436 |
| 7,113,778 B2 | * | 9/2006 | Karabinis | 455/427 |
| 7,593,691 B2 | * | 9/2009 | Karabinis | 455/63.1 |
| 7,623,859 B2 | * | 11/2009 | Karabinis | 455/427 |
| 7,774,016 B2 | * | 8/2010 | Lloyd et al. | 455/522 |
| 8,270,898 B2 | * | 9/2012 | Karabinis et al. | 455/12.1 |
| 2004/0005898 A1 | * | 1/2004 | Kato et al. | 455/450 |
| 2006/0194593 A1 | * | 8/2006 | Drabeck et al. | 455/456.5 |
| 2007/0189216 A1 | * | 8/2007 | Wang et al. | 370/331 |
| 2007/0191041 A1 | * | 8/2007 | Chapin | 455/509 |
| 2008/0125122 A1 | * | 5/2008 | Zhou et al. | 455/436 |
| 2010/0150104 A1 | * | 6/2010 | Yoon et al. | 370/331 |
| 2010/0240371 A1 | * | 9/2010 | Cook et al. | 455/436 |
| 2010/0323704 A1 | * | 12/2010 | Tailor et al. | 455/438 |
| 2011/0105059 A1 | * | 5/2011 | Gaal et al. | 455/127.1 |

* cited by examiner

*Primary Examiner* — Blane J Jackson

(57) ABSTRACT

In systems and methods of mitigating L-band signal interference in a wireless communication system, it is determined that an aggregate power level of a plurality of wireless devices using an L-band carrier in communication with an access node meets a power level threshold. A probability of successful handover to a second carrier for each of the wireless devices is determined. At least one of the wireless devices is selected based on the determined probability of successful handover and a transmit power metric of the wireless device, and the selected at least one wireless device can be handed over to the second carrier.

11 Claims, 5 Drawing Sheets

MITIGATING SIGNAL INTERFERENCE

TECHNICAL BACKGROUND

Wireless communication systems use a variety of frequency bands or carriers. Use of L-band spectrum (that is, in the approximately 1.6 GHz range) permits operators of wireless communication systems access to additional scarce regulated bandwidth. However, use of L-band carriers includes challenges not posed by the use of other bandwidth. For example, L-band carriers are typically adjacent to bandwidth used by Global Positioning System (GPS) satellites and receivers. The possibility exists for interference between wireless communication systems using L-band carriers and GPS systems, which is difficult to mitigate because of the different geometric and physical characteristics of terrestrial and satellite operations. Further, large numbers of terrestrial wireless devices operating on L-band carriers may increase an amount of interference between ground and satellite stations using similar bandwidth.

OVERVIEW

In operation, when it is determined that an aggregate power level of a plurality of wireless devices using an L-band carrier in communication with an access node meets a power level threshold, a probability of successful handover to a second carrier for each of the wireless devices is determined. At least one of the wireless devices is selected based on the determined probability of successful handover and a transmit power metric of the wireless device, and the selected at least one wireless device can be handed over to the second carrier.

DETAILED DESCRIPTION

In an embodiment, it is determined that an aggregate power level of a plurality of wireless devices using an L-band carrier in communication with an access node meets a power level threshold. A probability of successful handover to a second carrier for each of the wireless devices is determined, and at least one of the wireless devices is selected based on the determined probability of successful handover and a transmit power metric of the wireless device. In an embodiment, the selected at least one wireless device can be handed over to the second carrier. In an embodiment, alternatively or in addition, a command can be sent to reduce a transmit power of the selected at least one wireless device to reduce the aggregate power level below the power level threshold. In an embodiment, alternatively or in addition, a command can be sent to terminate a call session of the selected at least one wireless device to reduce the aggregate power level below the power level threshold.

Figure 1:
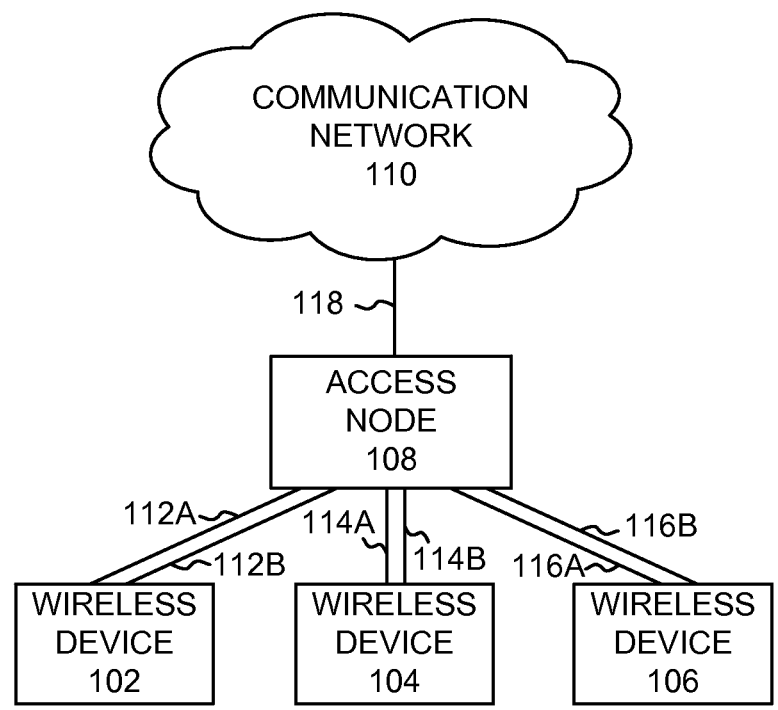
FIG. 1 illustrates an exemplary communication system to mitigate L-band signal interference in a wireless communication system.

FIG. 1 illustrates an exemplary communication system 100 to mitigate L-band signal interference in a wireless communication system comprising wireless devices 102, 104, 106, access node 108, and communication network 110. Examples of wireless devices 102, 104, 106 can include a cell phone, a smart phone, a computing platform such as a laptop, palmtop, or tablet, a personal digital assistant, an internet access device, or other similar device, including combinations thereof. Wireless devices 102, 104, 106 can communicate with access node 108 over at least two communication links. Wireless device 102 can communicate with access node 108 over communication links 112A and 112B. Similarly, wireless device 104 can communicate with access node 108 over communication links 114A and 114B, and wireless device 106 can communicate with access node 108 over communication links 116A and 116B. While three wireless devices are illustrated in communication with access node 108, this is merely exemplary, and a substantially greater number of wireless devices can communicate with access node 108.

Access node 108 is a network node capable of providing wireless communications to wireless devices 102, 104, 106, and can be, for example, a base transceiver station or an eNodeB device. Access node 108 is in communication with communication network 110 through communication link 118. While one access node is illustrated, this is merely exemplary, and additional access nodes, as well as adjacent access nodes, can also be present in communication system 100.

Communication network 110 may comprise a wireless network, including base stations, wireless communication nodes, telephony switches, internet routers, network gateways, computer systems, communication links, or some other type of communication equipment, and combinations thereof. Communication network 110 can also comprise a wired communication network comprising processing nodes, routers, gateways, and physical and/or wireless data links for carrying data among various network elements, including combinations thereof, and can include a local area network, a wide area network, and an internetwork (including the Internet). Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 112A, 112B, 114A, 114B, 116A, 116B and 118 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. In an embodiment, communication links 112A, 112B, 114A, 114B, 116A, 116B can be wireless communication links wherein communication links 112A, 114A and 116A comprise L-band communication links, and communication links 112B, 114B and 116B comprise communication links using another carrier or frequency band, for example 700 MHz, or 1.9 GHz, or another frequency band or carrier.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 108 and communication network 110 which are omitted for clarity, including additional processing nodes, routers, gateways, and physical and/or wireless data links for carrying data among the various network elements.

Figure 2:
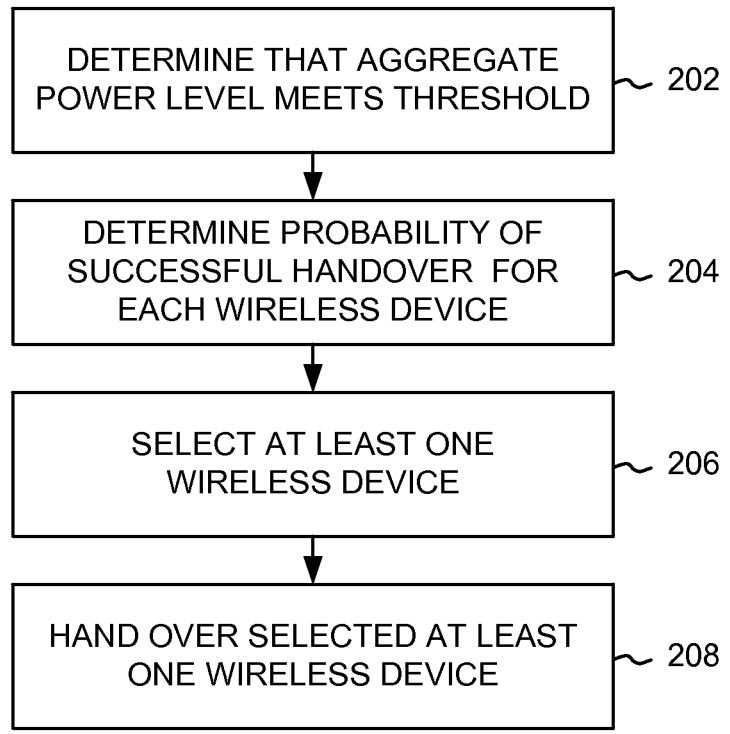
FIG. 2 illustrates an exemplary method of mitigating L-band signal interference in a wireless communication system.

FIG. 2 illustrates an exemplary method of mitigating L-band signal interference in a wireless communication system. In operation 202, it is determined that an aggregate power level of a plurality of wireless devices using an L-band carrier in communication with an access node meets a power level threshold. For example, wireless devices 102, 104 and 106 can be collectively monitored, and it can be determined that an aggregate power level of wireless devices 102, 104, 106 meets a power level threshold. In an embodiment, a power level of each wireless device can be a transmit power level of a signal transmitted from each wireless device to access node 108. When each of the wireless devices operate in the L-band, the power levels of each of the wireless devices can be aggregated to determine a cumulative impact on other systems using frequencies in or near the L-band, for example, satellite-to-ground communication or other systems using L-band communications. In an embodiment, a total power spectral density of the aggregated power levels can be monitored to determine whether it meets a power level threshold.

In operation 204, a probability of successful handover to a second carrier is determined for each of the wireless devices operating in the L-band. For example, a second carrier which is supported by each wireless device can be determined. The second carrier may be different for each wireless device; that is, the second carrier for wireless device 102 may differ from the second carrier for wireless device 104, and from the second carrier for wireless device 106. However, the second carrier of each of the wireless devices is accessible by each respective wireless device, and is an alternative to an L-band carrier. In an embodiment, an application requirement can be determined for an application running on each wireless device which requires communication of data with communication network 110. An application requirement can be, for example, a minimum data requirement, or a maximum permitted delay. Such determination is particularly important where a wireless device uses a delay-sensitive application, such as a voice application (for example, a VoIP application) or a data streaming application (such as streaming video or audio). In an embodiment, a quality of service (QoS) requirement for each wireless device can also be determined. (QoS is generally understood as an attempt by a network to guarantee a data rate or throughput to a device, which can be pursuant to a subscriber agreement.) In an embodiment, the resources available on the second carrier can also be determined. Available resources can comprise available bandwidth, a determination of network congestion (including air interface congestion and/or congestion elsewhere in the network, such as backhaul congestion), a number of wireless devices already using the second carrier, and the like. The probability of successful handover to the second carrier for each of the wireless devices can thus be determined based on at least one of determining a probability of successful handover to the second carrier based on at least one of resources available on a supported second carrier, the application requirement, and the QoS requirement of each wireless device.

In operation 206, at least one of the wireless devices is selected based on the determined probability of successful handover and a transmit power metric of the wireless device. A transmit power metric can comprise a transmit power level (or power level flux) of a wireless device. A transmit power metric can also comprise a location of a wireless device, since in operation a wireless device close to the edge of an access node coverage area and/or relatively far from the access node compared to other wireless devices in communication with the access node have relatively high transmit power levels to reach the access node. In an embodiment, at least one wireless device is selected based on the determined aggregate power level and the power level threshold. For example, if it is determined that handing over a single wireless device, such as wireless device 102, will reduce the aggregate power level below the power level threshold, wireless device 102 can be selected. In an embodiment, a wireless device with the highest transmit power level can be selected. In an embodiment, a wireless device closest to a cell edge of the access node can be selected. Other variations and combinations thereof are also possible.

In operation 208, the selected at least one wireless device is handed over to the second carrier. While FIG. 1 illustrates a second carrier (for example, 112B, 114B, 116B) supported by access node 108, in embodiments the second carrier can be a carrier of a second access node, and the selected at least one wireless device can be handed over to the second carrier supported by the second access node.

Figure 3:
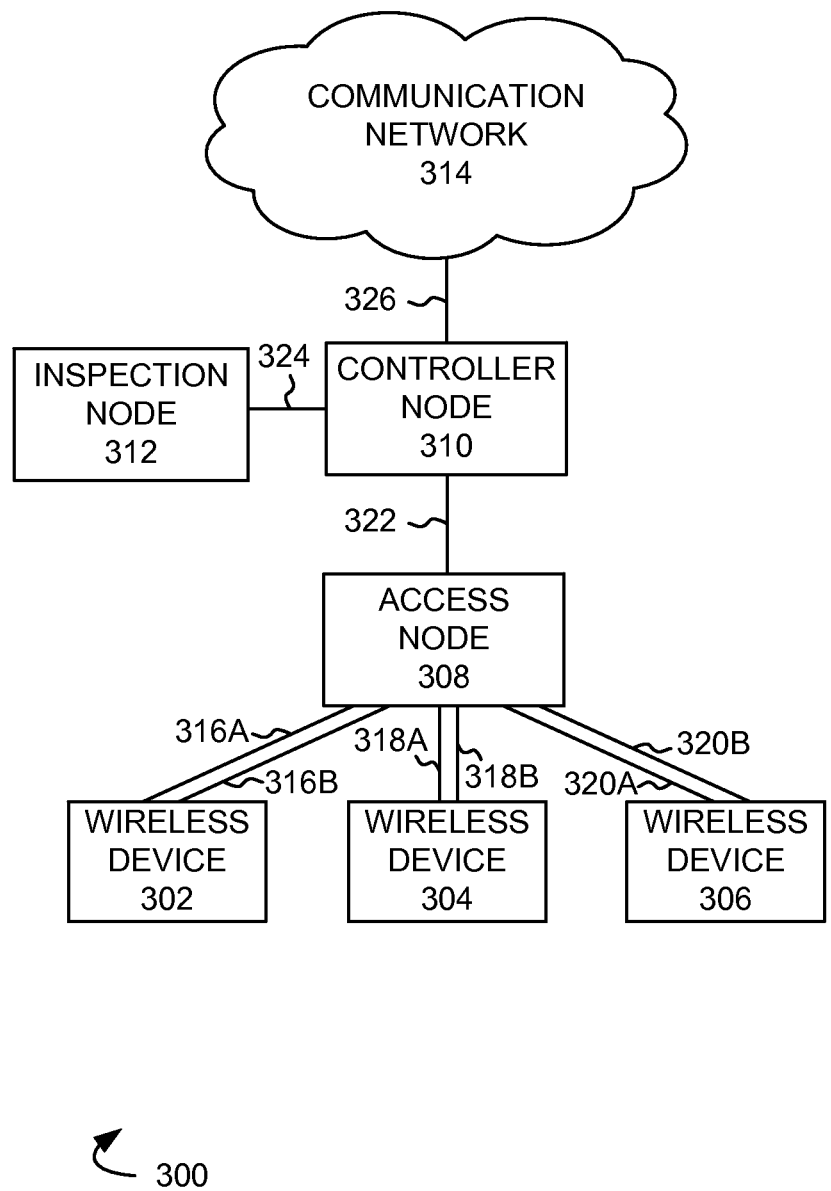
FIG. 3 illustrates another exemplary communication system to mitigate L-band signal interference in a wireless communication system.

FIG. 3 illustrates another exemplary communication system to mitigate L-band signal interference in a wireless communication system comprising wireless devices 302, 304, 306, access node 308, controller node 310, inspection node 312, and communication network 314. Examples of wireless devices 302, 304, 306 can include a cell phone, a smart phone, a computing platform such as a laptop, palmtop, or tablet, a personal digital assistant, an internet access device, or other device capable of voice communication using a plurality of dialers and communication protocols, including combinations thereof. Wireless devices 302, 304, 306 can each communicate with access node 308 over at least two communication links, illustrated as communication links 316A and 316B, 318A and 318B, and 320A and 320B, respectively.

Access node 308 is a network node capable of providing wireless communications to wireless devices 302, 304, 306, and can be, for example, a base transceiver station or an eNodeB device. Access node 108 is in communication with controller node 310 over communication link 322.

Controller node 310 is a network element capable of managing session states, authentication, paging, mobility with other network elements, including other wireless devices, roaming, and can perform additional bearer management functions. Examples of controller node 310 include a mobility management entity (MME), a serving gateway (SGW), a mobile switching center (MSC), or other similar network node, and can be associated with a database such as home or visitor location register.

Controller node 310 is in communication with inspection node 312 over communication link 324. Inspection node 312 is a network node, or portion of a network node, capable of performing deep packet inspection. Inspection node 312 can be a standalone network element, or it can be included in another network element, such as controller node 310. Controller node 310 is also in communication with communication network 314 over communication link 326.

Communication network 314 can be wired and/or wireless communication network, and can comprise base stations, wireless communication nodes, telephony switches, Internet routers, network gateways, computer systems, communication links, processing nodes, routers, gateways, and physical and/or wireless data links for carrying data among various network elements, including combinations thereof. Communication network 314 may also comprise or some other type of communication equipment, and combinations thereof. Communication network 314 can use wired and/or wireless protocols analogous to those described above regarding communication network 110.

Communication links 316A, 316B, 318A, 318B, 320A, 320B, 322, 324 and 326 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. In an embodiment, communication links 316A, 316B, 318A, 318B, 320A and 320B can be wireless communication links wherein communication links 316A, 318A and 320A comprise L-band communication links, and communication links 316B, 318B and 320B comprise communication links using another carrier or frequency band, for example 700 MHz, or 1.9 GHz, or another frequency band or carrier.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 308, controller node 310, inspection node 312, and communication network 314 which are omitted for clarity, including additional processing nodes, routers, gateways, and physical and/or wireless data links for carrying data among the various network elements.

Figure 4:
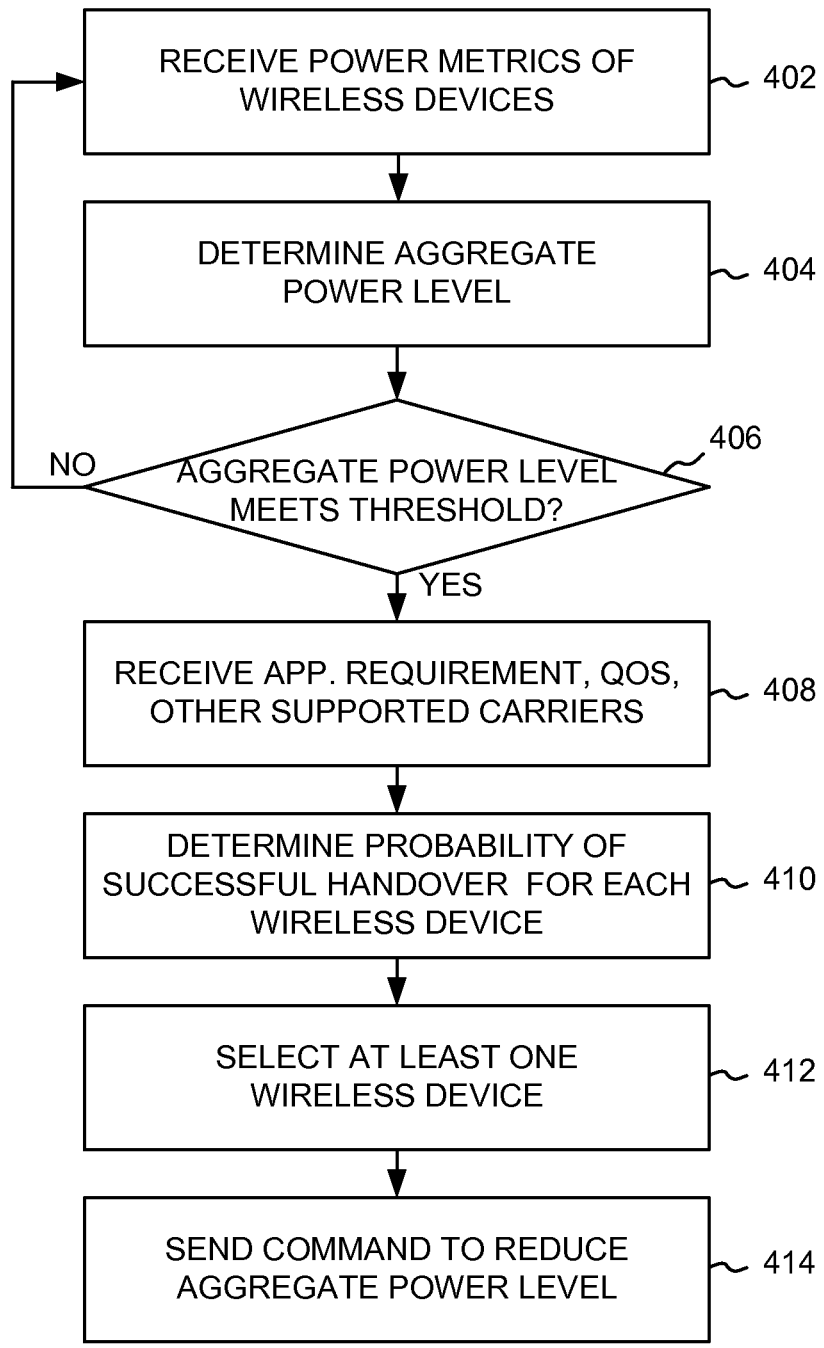
FIG. 4 illustrates another exemplary method of mitigating L-band signal interference in a wireless communication system

FIG. 4 illustrates another exemplary method of mitigating L-band signal interference in a wireless communication system. In operation 402, a power metric from each of a plurality of wireless devices is be received. For example, a power metric can be received from wireless devices 302, 304, 306 in communication with access node 308. A transmit power metric can comprise a transmit power level (or power level flux) of a wireless device. A transmit power metric can also comprise a location of a wireless device, since in operation a wireless device close to the edge of an access node coverage area and/or relatively far from the access node compared to other wireless devices in communication with the access node have relatively high transmit power levels to reach the access node. A transmit power metric can also comprise a power level which a wireless device is commanded to use, for example, by access node 308 or by controller node 310. In embodiments, a transmit power metric can comprise at least one of a transmit power level, a power headroom, a carrier interference-to-noise ratio, and a received signal strength indicator, as well as combinations thereof. Other transmit power metrics are also possible.

In operation 404, an aggregate power level is determined based on the received power metrics. For example, wireless devices 302, 304, 306 can be monitored, and it can be determined that an aggregate power level of wireless devices 302, 304, 306 meets a power level threshold. When each of the wireless devices 302, 304, 306 operate in the L-band, the power levels of each of the wireless devices can be aggregated to determine a cumulative impact on other systems using frequencies in or near the L-band, such as satellite-to-ground communication including GPS systems or other systems using L-band communications. In an embodiment, a total power spectral density of the aggregated power levels can be monitored to determine whether it meets a power level threshold.

When the aggregate power level of the plurality of wireless devices meets a power level threshold (operation 406-YES), information about each of the wireless devices 302, 304, 306 can be determined (operation 408). For example, a second carrier supported by each wireless device can be determined. The second carrier may be different for each wireless device; that is, the second carrier for wireless devices 302, 304 and 306 may each be different carriers, accessible by the respective wireless device, and which is an alternative to an L-band carrier. In an embodiment, an application requirement can also be determined for an application running on each wireless device which requires data from communication network 314. For example, inspection node 312 can perform deep packet inspection on data of each wireless device 302, 304, 306 to determine an application requirement for each wireless device. Deep packet inspection typically involves examination of a data portion of a packet (as well as possibly the header) beyond Open Systems Interconnection (OSI) level 2. An application requirement can be, for example, a minimum data requirement, or a maximum permitted delay. Such determination is particularly important where a wireless device uses a delay-sensitive application, such as a voice application (for example, a VoIP application) or a data streaming application (such as streaming video or audio). In an embodiment, a quality of service (QoS) requirement for each wireless device can also be determined. In an embodiment, the resources available on the second carrier can also be determined. Available resources can comprise available bandwidth, a determination of network congestion (including air interface congestion and/or congestion elsewhere in the network, such as backhaul congestion), a number of wireless devices already using the second carrier, and the like.

In operation 410, the probability of successful handover to the second carrier for each of the wireless devices can be determined based on at least one of determining a probability of successful handover to the second carrier based on at least one of resources available on a supported second carrier, the application requirement, and the QoS requirement of each wireless device.

At least one of the wireless devices is selected based on the determined probability of successful handover and a transmit power metric of the wireless device (operation 412), and a command is sent to the selected wireless device to reduce the aggregate power level (operation 414). In an embodiment, at least one wireless device is selected based on the determined aggregate power level and the power level threshold. In an embodiment, a command can be sent to reduce the transmit power metric of the selected wireless device to reduce the aggregate power level below the power level threshold. For example, it can be determined that reducing the transmit power metric of the selected wireless device will reduce the aggregate power level below the power level threshold, and a command can be sent to the selected wireless device to reduce the transmit power metric of that wireless device accordingly.

In an embodiment, a command can be sent to terminate a call session of the selected wireless device to reduce the aggregate power level below the power level threshold. For example, if a second carrier has insufficient resources to support the wireless device, and no alternative carriers are available, a command can be sent to terminate a call session of the wireless device.

Additionally or alternatively, in an embodiment a command can be sent to hand over the selected wireless device to a second carrier to reduce the aggregate power level below the power level threshold. The wireless device can be selected, for example, based on at least one of the location of a wireless device relative to a cell edge of the access node, and/or whether the transmit power metric of the wireless device meets a transmit power threshold, and/or an application requirement of an application of the wireless device. For example, if it is determined that handing over a single wireless device, such as wireless device 302, will reduce the aggregate power level below the power level threshold, wireless device 302 can be selected. In an embodiment, a wireless device with the highest transmit power level can be selected. In an embodiment, a wireless device closest to a cell edge of the access node can be selected. Other variations and combinations thereof are also possible.

In an embodiment, a command can also be sent limiting access to the L-band carrier to the plurality of wireless devices to prevent an additional wireless device from using the L-band carrier to maintain the aggregate power level below the power level threshold. For example, it can be determined that the addition of a wireless device to the L-band will cause the aggregate power level to meet the power level threshold. In such case, a command can be sent to deny to a wireless device access to the L-band carrier. An additional command can be sent to remove the limitation when the aggregate power level permits the addition of a wireless device to the L-band carrier without causing the aggregate power level to meet the power level threshold.

Figure 5:
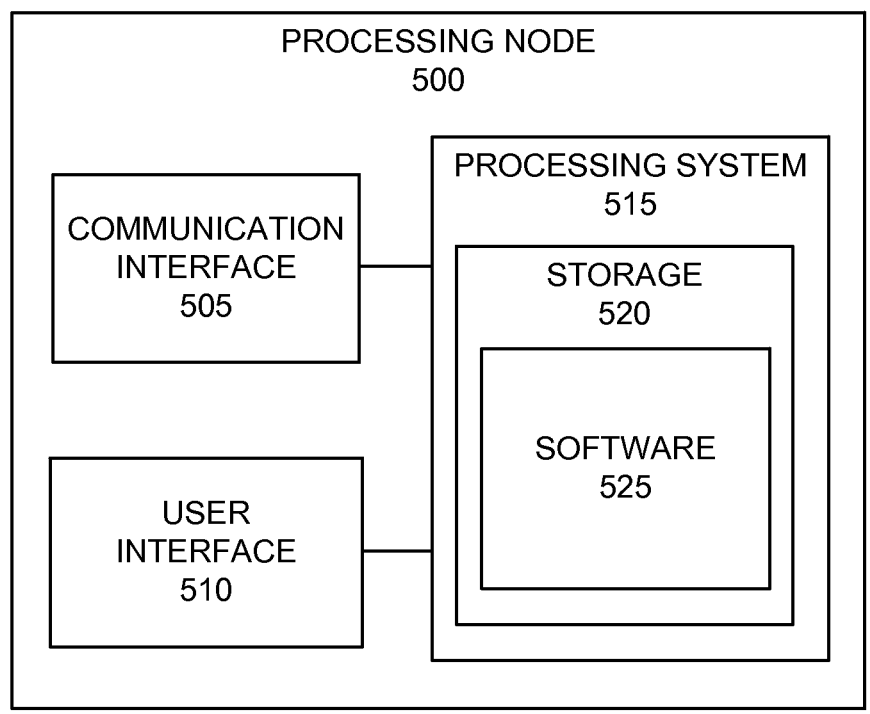
FIG. 5 illustrates an exemplary processing node.

FIG. 5 illustrates an exemplary processing node 500 in a communication system. Processing node 500 comprises communication interface 505, user interface 510, and processing system 515 in communication with communication interface 505 and user interface 510. Processing node 500 is capable of mitigating L-band signal interference. Processing system 525 includes storage 520, which can comprise a disk drive, flash drive, memory circuitry, or other memory device. Storage 520 can store software 525 which is used in the operation of the processing node 500. Storage 520 may include a disk drive, flash drive, data storage circuitry, or some other memory apparatus. Software 535 may include computer programs, firmware, or some other form of machine-readable instructions, including an operating system, utilities, drivers, network interfaces, applications, or some other type of software. Processing system 515 may include a microprocessor and other circuitry to retrieve and execute software 525 from storage 520. Processing node 500 may further include other components such as a power management unit, a control interface unit, etc., which are omitted for clarity. Communication interface 505 permits processing node 500 to communicate with other network elements. User interface 510 permits the configuration and control of the operation of processing node 500.

Examples of processing node 500 include access node 108, access node 308, controller node 310, and inspection node 312. Processing node 500 can also be an adjunct or component of a network element, such as an element of access node 108, access node 308, controller node 310, or inspection node 312. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for mitigating signal interference between frequency bands in a wireless communication system, comprising:
   determining that an aggregate power level based on a combined power of a plurality of wireless devices using a first carrier for communication with an access node meets a power level threshold for the first carrier;
   determining a probability of successful handover to a second carrier for each of the wireless devices, wherein the second carrier is a distinct frequency band from the first carrier, wherein determining a probability of successful handover further comprises:
   receiving for each wireless device at least one of an application requirement of an application, a quality of service (QoS) requirement, and an indication of the second carrier, wherein the second carrier is supported by the wireless device, and wherein the application requirement is determined by deep packet inspection of data from each wireless device; and
   determining a probability of successful handover to the second carrier based on at least one of resources available on the second supported carrier, the application requirement, and the QoS requirement;
   determining a transmit power metric for each of the wireless devices using the first carrier, wherein the transmit power metric represents a contribution by transmissions of each wireless device to the aggregate power level of the plurality of wireless devices using the first carrier for communication with the access node;
   selecting at least one wireless device of the plurality of wireless devices when the determined probability of successful handover from the first carrier to the second carrier is above a first probability threshold and the determined transmit power metric is above a first transmit power metric threshold for each of the selected wireless devices from among the plurality of wireless devices using the first carrier;

handing over the selected at least one wireless device to the second carrier;

determining whether the aggregate power level for wireless devices continuing to use the first carrier remains at or above the power level threshold; and selecting additional wireless devices for handover based on second probability threshold and a second transmit power metric threshold and handing over the additionally selected wireless devices until the determined aggregate power level for wireless devices using the first carrier is below the power level threshold.

2. The method of claim 1, wherein the transmit power metric comprises at least one of a transmit power level, a power headroom, a carrier interference-to-noise ratio, and a received signal strength indicator.

3. The method of claim 1, further comprising:

limiting access to the first carrier to the plurality of wireless devices to prevent an additional wireless device from an additional device from using the first carrier to maintain the aggregate power level below the power level threshold.

4. A method for mitigating L-band signal interference in a wireless communication system, comprising:

determining that an aggregate power level of a plurality of wireless devices using an L-band carrier in communication with an access node meets a power level threshold for the L-band carrier;

determining a probability of successful handover to a second carrier for each of the wireless devices, wherein the second carrier is a distinct frequency band from the L-band carrier, wherein determining a probability of successful handover further comprises:

receiving for each wireless device at least one of an application requirement of an application, a quality of service (QoS) requirement, and an indication of the second carrier, wherein the second carrier is supported by the wireless device, and wherein the application requirement is determined by deep packet inspection of data from each wireless device; and determining a probability of successful handover to the second carrier based on at least one of resources available on the second supported carrier, the application requirement, and the QoS requirement;

determining a transmit power metric for each of the wireless devices using the L-band carrier, wherein the transmit power metric represents a contribution by transmissions of each wireless device to the aggregate power level of the plurality of wireless devices using the L-band carrier for communication with the access node;

selecting at least one of the wireless devices when the determined probability of successful handover from the L-band carrier to the second carrier is above a probability threshold and the determined transmit power metric is above a transmit power metric threshold for each of the selected wireless devices from among the plurality of wireless devices; and sending a command for the selected at least one wireless device to reduce the aggregate power level below the power level threshold by reducing each transmit power metric below the transmit power metric threshold for the selected wireless devices.

5. The method of claim 4, wherein sending a command further comprises:

sending a command that the selected at least one wireless device be handed over to the second carrier to reduce the aggregate power level below the power threshold.

6. The method of claim 4, wherein sending a command further comprises:

sending a command that the selected at least one wireless device reduce a transmit power to reduce the aggregate power level below the power level threshold.

7. The method of claim 4, wherein sending a command further comprises:

sending a command to terminate a call session of the selected at least one wireless device to reduce the aggregate power level below the power level threshold.

8. The method of claim 4, further comprising:

limiting access to the L-band carrier to the plurality of wireless devices to prevent an additional wireless device from using the L-band carrier to maintain the aggregate power level below the power level threshold.

9. A system for mitigating signal interference in a wireless communication system, comprising:

a processing node configured to:

determine that an aggregate power level of a plurality of wireless devices using a first carrier in communication with an access node meets a power level threshold;

determine a probability of successful handover to a second carrier for each of the wireless devices, wherein to determine a probability of successful handover, the processing node is further configured to:

receive for each wireless device at least one of an application requirement of an application, a quality of service (QoS) requirement, and an indication of the second carrier, wherein the second carrier is supported by the wireless device, and wherein the application requirement is determined by deep packet inspection of data from each wireless device; and determine a probability of successful handover to the second carrier based on at least one of resources available on the second supported carrier, the application requirement, and the QoS requirement;

determine a transmit power metric for each of the wireless devices using the first carrier, wherein the transmit power metric represents a contribution by transmissions of each wireless device to the aggregate power level of the plurality of wireless devices using the first carrier for communication with the access node;

select at least one wireless device of the plurality of wireless devices when the determined probability of successful handover from the first carrier to the second carrier is above a probability threshold and the determined transmit power metric is above a transmit power metric threshold for each of the selected wireless devices from among the plurality of wireless devices using the first carrier; and command a handover of the selected at least one wireless device to the second carrier to reduce the aggregate power level below the power level threshold.

10. The system of claim 9, wherein the transmit power metric comprises at least one of a transmit power level, a power headroom, a carrier interference-to-noise ratio, and a received signal strength indicator.

11. The system of claim 9, wherein the processing node is further configured to:

limit access to the first carrier to the plurality of wireless devices to prevent an additional wireless device from using the first carrier to maintain the aggregate power level below the power level threshold.

* * * * *